United States Patent
Sudoh et al.

(10) Patent No.: US 8,080,228 B2
(45) Date of Patent: Dec. 20, 2011

(54) GRAPHITE MATERIAL, CARBON MATERIAL FOR BATTERY ELECTRODE, AND BATTERY

(75) Inventors: Akinori Sudoh, Minato-ku (JP); Masataka Takeuchi, Minato-ku (JP)

(73) Assignee: Showa Denka K.K., Tokyo (JP)

( * ) Notice: Subject to any disclaimer, the term of this patent is extended or adjusted under 35 U.S.C. 154(b) by 0 days.

(21) Appl. No.: 12/778,789

(22) Filed: May 12, 2010

(65) Prior Publication Data

US 2010/0221543 A1 Sep. 2, 2010

Related U.S. Application Data

(62) Division of application No. 12/096,122, filed as application No. PCT/JP2006/324293 on Dec. 5, 2006.

(30) Foreign Application Priority Data

| Dec. 5, 2005 | (JP) | 2005-350138 |
| Dec. 20, 2005 | (JP) | 2005-365878 |
| Dec. 21, 2005 | (JP) | 2005-368727 |

(51) Int. Cl.
*C01B 31/04* (2006.01)
(52) U.S. Cl. ........ 423/448; 423/414; 252/502; 264/29.1
(58) Field of Classification Search ............... 252/182.1, 252/511, 502; 429/231.4, 232; 423/414, 423/448; 264/29.1
See application file for complete search history.

(56) References Cited

U.S. PATENT DOCUMENTS

| 6,489,026 B1 | 12/2002 | Nishimura et al. |
| 6,632,569 B1 * | 10/2003 | Kameda et al. ............ 429/231.8 |
| 6,946,110 B2 | 9/2005 | Nishimura et al. |
| 6,989,137 B1 | 1/2006 | Nishimura et al. |
| 2006/0188717 A1 | 8/2006 | Kambara |

FOREIGN PATENT DOCUMENTS

| JP | 2001-0023638 A | 1/2001 |
| JP | 2004-003097 A | 1/2004 |
| JP | 2004-319186 A | 11/2004 |
| JP | 2005-008436 | * 1/2005 |
| JP | 2005-008436 A | 1/2005 |
| JP | 2005-232667 A | 9/2005 |

OTHER PUBLICATIONS

Translation of JP2005-008436.*

* cited by examiner

*Primary Examiner* — Mark Kopec
*Assistant Examiner* — Haidung Nguyen
(74) *Attorney, Agent, or Firm* — Sughrue Mion, PLLC

(57) ABSTRACT

A graphite material is provided wherein D50% is 2 to 9 μm in particle diameter distribution based on volume as measured by laser diffraction, a specific surface area is 2 to 6 m²/g and no coating layer is substantially included in a surface of the particle. Also provided is a graphite material comprising substantially single-composition particles having an isotropic crystal structure, wherein D50% is 2 to 9 μm in particle diameter distribution based on volume as measured by laser diffraction, and a specific surface area is 2 to 6 m²/g.

8 Claims, 2 Drawing Sheets

GRAPHITE MATERIAL, CARBON MATERIAL FOR BATTERY ELECTRODE, AND BATTERY

This application is a Divisional of U.S. application Ser. No. 12/096,122, which is a 371 of International Application No. PCT/JP2006/324293 filed on Dec. 5, 2006, hereby incorporated by reference.

TECHNICAL FIELD

This application claims priority based on Japanese Application Nos. 2005-350138, 2005-365878 and 2005-368727 filed on Dec. 5, 2005, Dec. 20, 2005 and Dec. 21, 2005, respectively, the entire contents of which are hereby incorporated by reference.

The present invention relates to a graphite material, a carbon material for battery electrodes and a battery. More particularly, the invention relates to a graphite material and a carbon material for battery electrodes that are suitable as electrode materials for nonaqueous electrolyte solution secondary batteries, and also relates to a secondary battery having an excellent charge-discharge cycle characteristics and an excellent large-current load characteristics.

BACKGROUND ART

Lithium secondary batteries are mainly used as power supplies in portable devices and the like. Portable devices and the like have a variety of capabilities and thus consume a large amount of electric power. For this reason, lithium secondary batteries are required to increase battery capacities and to enhance charge-discharge cycle characteristics. High-power, high-capacity secondary batteries for use in electric tools such as an electric drill, hybrid cars and the like are increasingly required. Conventionally, lead-acid secondary batteries, nickel-cadmium secondary batteries and nickel-metal-hydride secondary batteries are mainly used in these fields. Compact, lightweight and high-energy density lithium-ion secondary batteries, however, are highly expected to be used, and thus lithium-ion secondary batteries having excellent large-current load characteristics are desired.

In general, in the lithium secondary batteries, lithium salt such as lithium cobaltate is used as a cathode active material, and carbonaceous material such as graphite is used as an anode active material.

Mesocarbon spherules are widely used as graphite serving as a anode active material. The production process of the mesocarbon spherules is, however, complicated, and this makes it extremely difficult to reduce cost of the mesocarbon spherules.

In Graphite, there are natural graphite and artificial graphite. The natural graphite is available at low cost. However, it is shaped like scales. Thus, when the natural graphite and binder are mixed into a paste and the paste is then applied to a collector, the natural graphite is oriented in only one direction. When charging is performed using such an electrode, the electrode expands in only one direction, and this causes degraded performance of the electrode. Although it is suggested that natural graphite be spherically granulated, the spherically granulated natural graphite collapses to become oriented in the same direction by being pressed when electrodes are produced. In addition, since the surface of the natural graphite is active, a large amount of gas is generated in the first charging, resulting in reduced beginning efficiency and a poor cycle characteristic.

Artificial graphite typified by graphitized products from petroleum oil, coal pitch, coke and the like is available at relatively low cost. It is high in strength and resistant to collapse. However, needle coke that is easily crystallized is likely to form a scale-like shape to become oriented in the same direction. Non-needle coke is likely to form substantially spherical particles, but it often has a slightly low discharge capacity and poor beginning efficiency.

Under these situations, instead of mesocarbon spherules, various inexpensive graphite materials for battery electrodes are being researched. Patent document 1 discloses a carbon material for an anode in a lithium secondary battery, namely, graphitized carbon powder prepared by subjecting carbon powder made of pitch in the presence of a boron compound to heat treatment, characterized in that the coefficient of thermal expansion (CTE) of the carbon powder, the interplanar spacing ($d_{002}$) of graphite plane as measured by X-ray diffraction, the length (Lc) of a crystallite in the direction of the C-axis and the ratio ($R=I_{1360}/I_{1580}$) of the strength of 1360 $cm^{-1}$ band to the strength of 1580-$cm^{1}$ band as measured by Raman spectroscopy using an argon laser are $CTE \leq 3.0 \times 10^{-6}$ $C.^{-1}$, $d_{002} \leq 0.337$ nm, $Lc \geq 40$ nm and $R \geq 0.6$, respectively.

Patent document 2 discloses a carbon material for an anode in a lithium secondary battery, namely, graphitized carbon powder obtained by graphitizing green coke powder produced from at least one of coke raw materials of petroleum-derived or coal-derived heavy oils after it is heated and oxidized under an atmosphere of oxidized gas, characterized in that, the interplanar spacing ($d_{002}$) of graphite planes of the carbon powder as measured by wide angle X-ray diffraction, the length (Lc) of a crystallite in the direction of the C-axis, the coefficient of thermal expansion (CTE) and the ratio ($R=I_{1360}/I_{1580}$) of the strength of a peak in the vicinity of 1360 $cm^{-1}$ to the strength of a peak in the vicinity of 1580 $cm^{-1}$ as measured by Raman spectroscopy using an argon laser are $d_{002} \leq 0.337$ nm, $Lc \geq 30$ nm, $CTE \geq 3.0 \times 10^{-6}$ $C.^{-1}$ and $R \geq 0.3$, respectively.

In patent document 3, the assignee of the present invention discloses a carbon material for a lithium battery, the carbon material being composed of graphite powder that is obtained by pulverizing and graphitizing calcined coke and is characterized in that the specific surface area is no more than 3 $m^2/g$, the aspect ratio is no more than 6 and the tapping bulk density is no less than 0.8 $g/cm^3$.

Patent document 1: JP-A-H08-031422
Patent document 2: JP-A-H10-326611
Patent document 3: WO 00/22687

DISCLOSURE OF THE INVENTION

Problems to be Solved by the Invention

With the graphite materials proposed in patent document 1 or 2, however, it is impossible to obtain sufficient beginning efficiency and a sufficient discharge capacity. With the graphite material proposed in patent documents 3, it is possible to obtain a high discharge capacity, an excellent cycle characteristic and an excellent charge-discharge efficiency. The graphite materials proposed in patent documents 1 to 3 have a great tendency to have a tap density slightly lower than the mesocarbon spherules. This is probably due to the shape of particles and more specifically, for example, the aspect ratio. The low tap density prevents the electrode density from increasing, with the result that the battery capacity decreases. In a case where the same particle size distribution is achieved, as compared with the mesocarbon spherules, the graphite materials inevitably tend to have a larger specific surface area.

An increase in the specific surface area causes an increase in the amount of binder used, and this increases the proportion of the binder in the electrode. Since the binder is not involved in charging and discharging, the battery capacity decreases.

As will be understood from the above description, it is quite difficult to obtain sufficient performance using the anode material produced by crushing coke, instead of using the mesocarbon spherules.

The inventors of the present invention have found that it is possible to reduce the diffusion time of lithium in graphite and thus improve the current load characteristic of anode material by decreasing the diameter of graphite material and more specifically by decreasing D50 from about 15 μm, which is typical, to about 2-9 μm.

However, when the particle size was reduced to such a particle size with the methods disclosed in patent document 1, 2 or 3, the specific surface area was found to be 10 $m^2/g$ or more in most cases. Although the large specific area advantageously increases the number of the sites through which lithium ions enter between graphite layers, chemically active portions are increased and thus the amount of SEI (solid electrolyte interface) or the like generated is increased. This leads to significantly degraded charge-discharge efficiency in the first round of charging and discharging. Moreover, when the specific surface area is increased, the amount of binder used is increased, and thus the amount of anode material in an electrode is reduced.

In order to obtain a battery with priority given to the large-current load characteristic, it is necessary to reduce the internal resistance of the battery. One way to achieve this is to reduce the thickness of applied material on an electrode. It is thought that when SBR (styrene-butadiene rubber) based binders are used, graphite materials that electrodes can be made of are of a specific surface area of about 4 to 6 $m^2/g$ in terms of viscosity of the binders. It is also thought that when PVDF (polyvinylidene-difluoride) based binders are used, graphite materials that electrodes can be made of are of a specific surface area of 2 to 3 $m^2/g$ or less. It is extremely difficult to produce graphite materials having such a particle size and a specific surface area, with the exception of some expensive mesocarbon.

It is an object of the present invention to provide, at a low cost, a graphite material suitable for an electrode active material of a lithium-ion secondary battery and characterized in that its beginning efficiency in the first round of charging and discharging is much higher than that of conventional graphite materials, its charge capacity is high and the particles of the graphite material have a low aspect ratio.

It is another object of the present invention to provide, at a low cost, a graphite material that is suitable for an anode carbon material of a lithium-ion secondary battery or the like, capable to make electrodes having a high-energy density thereof since the graphite material has a high tap density and the particles of the graphite material have a low specific area and a low aspect ratio, while its beginning efficiency and discharge capacity in the first round of charging and discharging are kept equal to or higher than those of conventional graphite materials.

It is yet another object of the present invention to provide, at a low cost, a graphite material that is suitable for the anode carbon material of a lithium-ion secondary battery or the like, capable to make electrodes having a high-energy density and a large-current load characteristic thereof since the graphite material has a small specific surface area and a small average particle diameter, while its beginning efficiency and discharge capacity in the first round of charging and discharging are kept equal to or higher than those of conventional graphite materials.

Means for Solving the Problem

When petroleum coke is produced, the temperature of a coker is generally about 500° C., and the produced green coke still contains moisture and volatile components. Thereafter, in order for the volatile components to be removed, in general, the green coke is calcined at about 1200° C. When the calcined coke is pulverized, however, projections and depressions are formed on the surface of the calcined coke. Thus, the granular calcined coke having a high aspect ratio is obtained. Even when this granular calcined coke is graphitized, the projections and depressions on the surface are not sufficiently smoothened, and the specific surface area is not reduced as expected.

The inventors of the present invention found the following. Instead of common calcined coke, green coke still containing volatile components is pulverized and is then graphitized. In this way, it is possible to reduce the aspect ratio, the size of projections and depressions on the surface of the particles and the specific surface area after graphitization.

After detailed consideration, the inventors of the present invention further found the following. A carbon raw material in which the loss on heat when the carbon raw material is heated from 300 to 1200° C. under an inert atmosphere ranges from 5% by mass to 20% by mass is pulverized without being calcined and is then subjected to heat treatment (graphitization) under specifically given conditions. The graphite material obtained in such an inexpensive and simple method has substantially spherical particles. When the graphite material is used as electrode material, a high capacity, an excellent cycle characteristic and an extremely low irreversible capacity are achieved.

With the method described above, the inventors of the present invention also found the following. A graphite material is obtained in which the primary particles have an aspect ratio of 1.00 to 1.32 and in which no coating layer is substantially included in the surface of the particles, or substantially single-composition particles having an isotropic crystal structure are comprised. Moreover, the inventors of the present invention found that when the graphite material is used as electrode material, a high capacity, an excellent cycle characteristic and an extremely low irreversible capacity are achieved.

With the method described above, the inventors of the present invention still further found the following. A graphite material is obtained in which D50% is 2 to 9 μm in particle diameter distribution based on volume as measured by laser diffraction, and the specific surface area is 2 to 6 $m^2/g$, and in which no coating layer is substantially included in the surface of the particles or substantially single-composition particles having an isotropic crystal structure are comprised. Moreover, the inventors of the present invention found that when the graphite material is used as electrode material, a high capacity, an excellent cycle characteristic and an extremely low irreversible capacity are achieved.

After further consideration based on these findings, the present invention is completed.

The present invention includes the following aspects.
(1) A method for producing a graphite material, comprising the steps of: pulverizing a carbon raw material in which loss on heat when the carbon raw material is heated from 300 to 1200° C. under an inert atmosphere is no less than 5% by mass and no more than 20% by mass; and then graphitizing the pulverized carbon raw material.

(2) The method for producing a graphite material according to (1), where the carbon raw material is a petroleum-derived pitch coke or a coal-derived pitch coke.

(3) The method for producing a graphite material according to (1), wherein the carbon raw material is a green coke.

(4) The method for producing a graphite material according to any one of (1) to (3), wherein the graphitization temperature is no less than 3000° C. and no more than 3300° C.

(5) The method for producing a graphite material according to any one of (1) to (4), wherein the carbon raw material is a non-needle coke.

(6) The method for producing a graphite material according to any one of (1) to (5), wherein the graphitization is performed in an Acheson furnace.

(7) A graphite material obtained by the producing method according to any one of (1) to (6).

(8) The graphite material according to (7), wherein a ratio $I_D/I_G$ (R value) of a peak strength ($I_D$) in a vicinity of 1360 $cm^{-1}$ to a peak strength ($I_G$) in a vicinity of 1580 $cm^{-1}$ as measured by Raman spectroscopy is no less than 0.01 and no more than 0.2, and a coefficient of thermal expansion (CTE) at temperatures of 30 to 100° C. is no less than $4.0 \times 10^{-6}/°$ C. and no more than $5.0 \times 10^{-6}/°$ C.

(9) The graphite material according to (7) or (8), wherein D50% is 10 to 25 µm in particle diameter distribution based on volume as measured by laser diffraction.

(10) The graphite material according to any one of (7) to (9), wherein a loose bulk density is no less than 0.70 g/cm³, and a powder density is no less than 1.0 g/cm³ and no more than 1.35 g/cm³ after tapping is performed 400 times.

(11) The graphite material according to any one of (7) to (10), wherein a specific surface area is 0.8 to 1.8 m²/g.

(12) The graphite material according to any one of (7) to (11), wherein an average interplanar spacing $d_{002}$ of (002) plane as measured by X-ray diffraction is 0.3362 nm to 0.3370 nm.

(13) The graphite material according to any one of (7) to (12), wherein an aspect ratio determined from an optical microscope image is no less than 1 and no more than 5.

(14) A graphite material, wherein an aspect ratio of a primary particle is 1.00 to 1.32, and no coating layer is substantially included in a surface of the particle.

(15) A graphite material, comprising substantially single-composition particles having an isotropic crystal structure, wherein an aspect ratio of a primary particle is 1.00 to 1.32.

(16) The graphite material according to (14) or (15), wherein a non-needle coke is used as a raw material.

(17) The graphite material according to (16), wherein the non-needle coke is a petroleum-derived pitch coke.

(18) The graphite material according to any one of (14) to (17), wherein a laser Raman R value is no less than 0.01 and no more than 0.2, and a CTE at temperatures of 30 to 100° C. is no less than $4.0 \times 10^{-6}/°$ C. and no more than $5.0 \times 10^{-6}/°$ C.

(19) The graphite material according to any one of (14) to (18), wherein D50% is 10 to 25 µm in particle diameter distribution based on volume as measured by laser diffraction.

(20) The graphite material according to any one of (14) to (19), wherein $d_{002}$ is 0.3362 nm to 0.3370 nm.

(21) The graphite material according to any one of (14) to (20), wherein a specific surface area is 0.8 to 1.8 m²/g.

(22) The graphite material according to any one of (14) to (21), wherein a loose bulk density is no less than 0.7 g/cm³, and a powder density is no less than 1.0 g/cm³ and no more than 1.35 g/cm³ after tapping is performed 400 times.

(23) A graphite material, wherein D50% is 2 to 9 µm in particle diameter distribution based on volume as measured by laser diffraction, a specific surface area is 2 to 6 m²/g and no coating layer is substantially included in a surface of the particle.

(24) A graphite material comprising substantially single-composition particles having an isotropic crystal structure, wherein D50% is 2 to 9 µm in particle diameter distribution based on volume as measured by laser diffraction, and a specific surface area is 2 to 6 m²/g.

(25) The graphite material according to (23) or (24), wherein a non-needle coke is used as a raw material.

(26) The graphite material according to (25), wherein the non-needle coke is a petroleum-derived pitch coke.

(27) The graphite material according to any one of (23) to (26), wherein a laser Raman R value is no less than 0.01 and no more than 0.2, and a CTE at temperatures of 30 to 100° C. is no less than $4.0 \times 10^{-6}/°$ C. and no more than $5.0 \times 10^{-6}/°$ C.

(28) The graphite material according to any one of (23) to (27), wherein $d_{002}$ is 0.3362 nm to 0.3370 nm.

(29) The graphite material according to any one of (23) to (28), wherein an aspect ratio of a primary particle is 1.00 to 1.32.

(30) The graphite material according to any one of (23) to (29), wherein a loose bulk density is no less than 0.4 g/cm³, and a powder density is no less than 0.5 g/cm³ and no more than 1 g/cm³ after tapping is performed 400 times.

(31) A carbon material for battery electrodes, the carbon material comprising the graphite material according to any one of (7) to (30).

(32) The carbon material for battery electrodes according to (31), the carbon material further comprising a carbon fiber having a fiber diameter of 2 to 1000 nm.

(33) The carbon material for battery electrodes according to (32), wherein 0.01 to 20 parts by mass of the carbon fiber are contained with respect to 100 parts by mass of the graphite material.

(34) The carbon material for battery electrodes according to (32) or (33), wherein the carbon fiber has an aspect ratio of 10 to 15000.

(35) The carbon material for battery electrodes according to any one of (32) to (34), wherein the carbon fiber is a vapor grown carbon fiber.

(36) The carbon material for battery electrodes according to any one of (32) to (35), wherein the carbon fiber is subjected to a heat treatment at a temperature of 2000° C. or higher.

(37) The carbon material for battery electrodes according to any one of (32) to (36), wherein the carbon fiber has a hollow structure inside the carbon fiber.

(38) The carbon material for battery electrodes according to any one of (32) to (37), wherein the carbon fiber comprises a branched carbon fiber.

(39) The carbon material for battery electrodes according to any one of (32) to (38), wherein the carbon fiber is no more than 0.344 nm in an average interplanar spacing $d_{002}$ of (002) plane as measured by X-ray diffraction.

(40) A paste for electrodes, the paste comprising the carbon material for battery electrodes according to any one of (31) to (39) and a binder.

(41) An electrode composed of a molded piece of the paste for electrodes according to (40).

(42) A battery comprising the electrode according to (41) as a component.

(43) A secondary battery comprising the electrode according to (41) as a component.
(44) An electric tool comprising the battery according to any one of (41) to (43) as a component.
(45) A car comprising the battery according to any one of (41) to (43) as a component.

Effects of the Invention

When the graphite materials according to the present invention are used as carbon material for battery electrodes, high-energy density battery electrodes can be obtained while a high capacity, high coulombic efficiency and an excellent cycle characteristic are maintained.

The producing method according to the present invention is a method that achieves increased economy, increased productivity and improved safety.

EXPLANATION OF REFERENCE SYMBOLS

Figure 1:
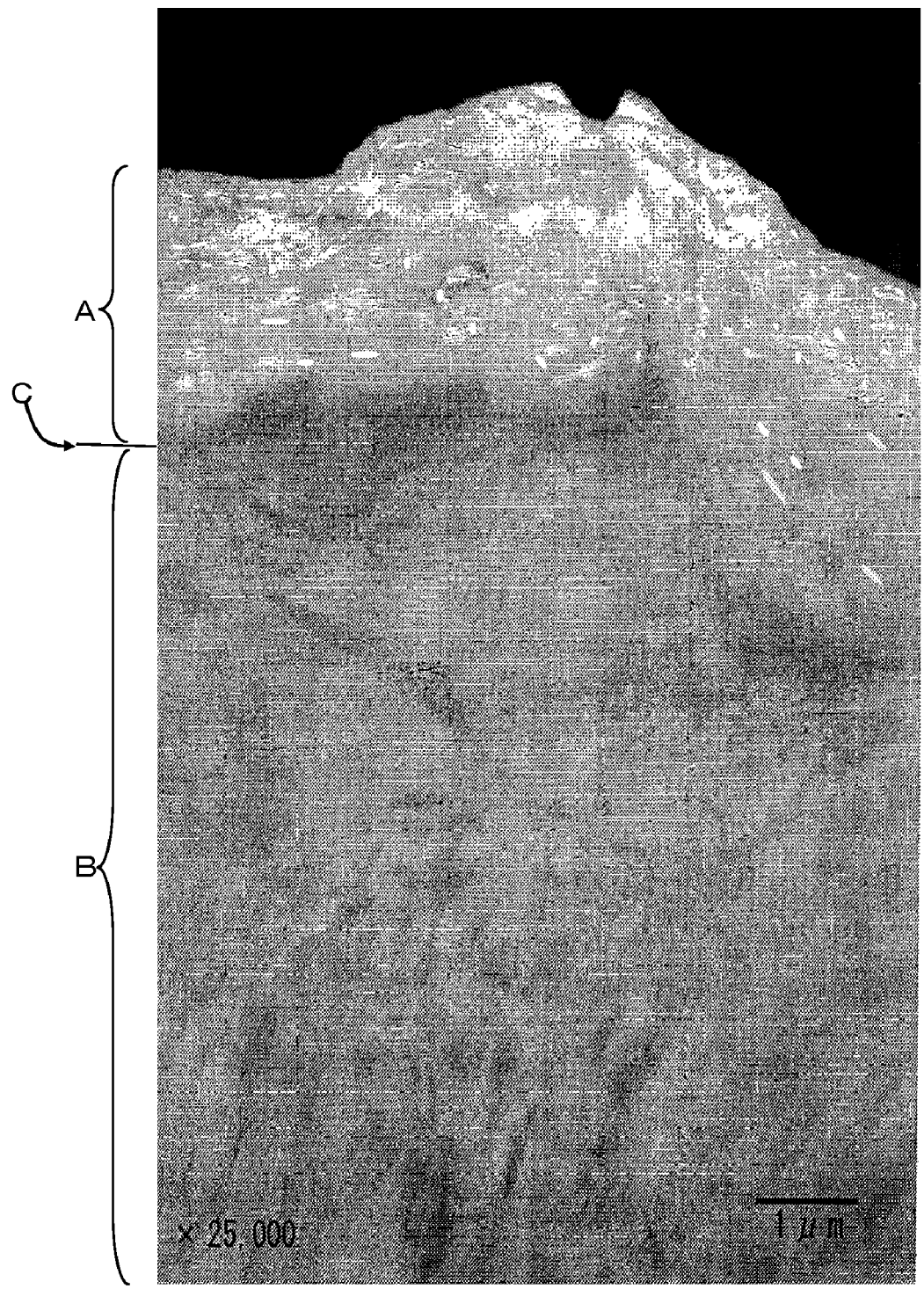
FIG. 1 is a diagram showing a cross-sectional image of mesocarbon as observed by transmission electron microscopy (TEM)

A: Surface layer (coating layer)
B: Inner layer
C: Boundary

BEST MODE FOR CARRYING OUT THE INVENTION

Hereinafter, the present invention will be described in detail.
(Graphite Material 1)

In a graphite material 1 according to a first embodiment of the present invention, the ratio $I_D/I_G$ (R value) of a peak strength ($I_D$) in the vicinity of 1360 cm$^{-1}$ to a peak strength ($I_G$) in the vicinity of 1580 cm$^{-1}$ as measured by Raman spectroscopy is preferably no less than 0.01 and no more than 0.2. When the R value is more than 0.2, a large number of highly activated edge portions of graphite material are exposed to the surface thereof. Thus, during charging and discharging, a large number of side reactions occur. In contrast, when the R value is less than 0.01, barriers that prevent the entering and exiting of lithium are higher, and this causes the current load characteristic to be degraded.

The laser Raman R value is measured using "NRS3100" made by JASCO Corporation under the conditions that the excitation wavelength is 532 nm, the width of the entrance slit is 200 μm, the exposure period is 15 seconds, the totaling is performed twice and the diffraction grating has 600 bars per millimeter.

In the graphite material 1 in the present invention, the coefficient of thermal expansion (CTE) at temperatures of 30 to 100° C. is preferably no less than $4.0\times10^{-6}/°$ C. and no more than $5.0\times10^{-6}/°$ C. The coefficient of thermal expansion is utilized as an indicator that shows the acicularity of coke. Although graphite materials with a coefficient of thermal expansion of lower than $4.0\times10^{-6}/°$ C. have high crystallinity of graphite and a high discharge capacity, the particles thereof are more likely to form a plate-like shape. In contrast, although graphite materials with a coefficient of thermal expansion of higher than $5.0\times10^{-6}/°$ C. have a low aspect ratio, the crystals of graphite are not grown, and a discharge capacity is low. The CTE of the graphite material 1 is measured in the same manner as that of a carbon raw material, which will be described later.

In the graphite material 1 in the present invention, the average interplanar spacing $d_{002}$ of (002) plane as measured by X-ray diffraction is preferably 0.3362 nm to 0.3370 nm. The interplanar spacing $d_{002}$ can be measured in a known manner by powder X-ray diffraction (XRD) (see the 117th committee material 117-71-A-1 (1963) of Japan Society for the Promotion of Science by Inakichi Noda and Michio Inagaki, the 117th committee material 117-121-C-5 (1972) of Japan Society for the Promotion of Science by Michio Inagaki et al. and "carbon" No. 36, pp. 25-34, 1963 by Michio Inagaki).

In the graphite material 1 in the present invention, the aspect ratio (the length of a long axis/the length of a short axis) is preferably no more than 6, and more preferably is no less than 1 and no more than 5. The aspect ratio can be determined from optical microscope images. The aspect ratio may simply be measured by image analysis using "FPIA3000" made by Sysmex Corporation.

In the graphite material 1 in the present invention, the specific surface area (as measured by BET method) is preferably no more than 2 m$^2$/g, and more preferably 0.8 to 1.8 m$^2$/g. When the graphite material has a specific surface area of more than 2 m$^2$/g, the surface activity of the particles thereof is higher, and the coulombic efficiency may be decreased due to decomposition of electrolytic solution or other factors.

Preferably, in the graphite material 1 in the present invention, the loose bulk density is no less than 0.70 g/cm$^3$, and the powder density is no less than 1.0 g/cm$^3$ and no more than 1.35 g/cm$^3$ after tapping is performed 400 times.

In the graphite material 1 in the present invention, D50% is preferably 10 to 25 μm in particle diameter distribution based on volume as measured by laser diffraction.
(Graphite Material 2)

In a graphite material 2 according to a second embodiment of the present invention, the primary particles have an aspect ratio of 1.00 to 1.32 and no coating layer is substantially included in the surface of the particles. Or the graphite material 2 in the present invention comprises substantially single-composition particles having an isotropic crystal structure, wherein the primary particles have an aspect ratio of 1.00 to 1.32.

Figure 2:
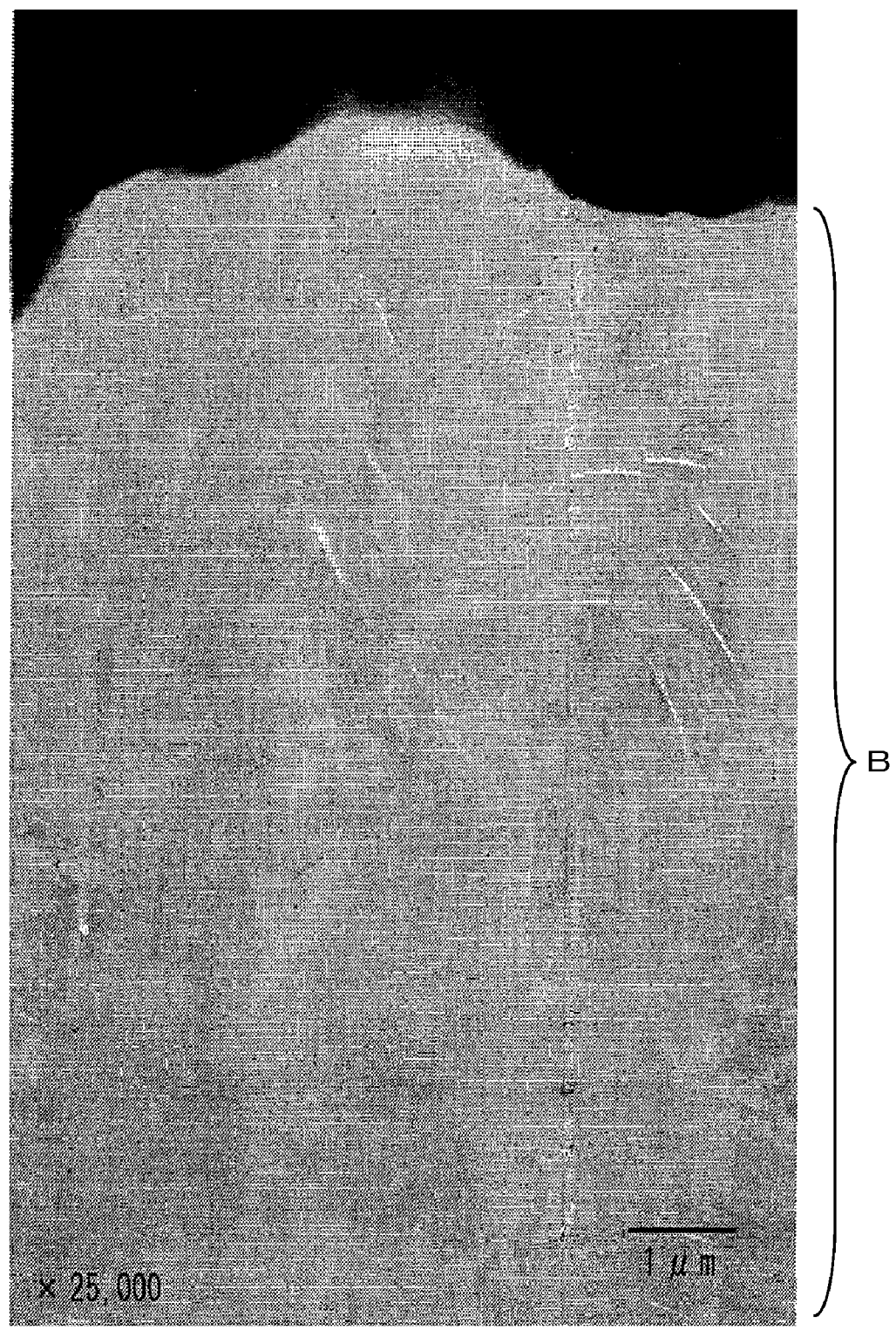
FIG. 2 is a diagram showing a cross-sectional image of graphite material according to the present invention as observed by TEM.

FIG. 1 shows a cross-sectional image of meso-phase carbon as observed by transmission electron microscopy (TEM); FIG. 2 shows a cross-sectional image of the graphite material 2 in the present invention as observed by TEM.

As will be understood from FIG. 1, in the meso-phase carbon, its surface layer A has a white color (in a state where electron beams are more likely to be transmitted), and its inner layer B has a gray color (in a state where electron beams are less likely to be transmitted). A boundary C appears clearly between the surface layer and the inner layer.

In contrast, as shown in FIG. 2, the graphite material 2 in the present invention has no boundary between the surface layer and the inner layer and has a gray color evenly from the surface layer to the inner layer. That is, in the graphite material in the present invention, there is substantially no coating layer, or an isotropic crystal structure is formed and a single composition is substantially formed.

In the graphite material 2 in the present invention, the aspect ratio (the maximum length $D_{max}$/the vertical length relative to the maximum length $DN_{max}$ ($D_{max}$=the maximum length between any two points on the perimeter of the image of a particle; $DN_{max}$=the shortest length of a line that, when the image is interposed between two lines parallel to the line of the maximum length, vertically connects the two lines) is 1.0 to 1.32. The aspect ratio can be measured by image analysis using "FPIA3000" made by Sysmex Corporation. At least 3000 points, preferably 30000 points or more, more preferably 50000 points or more are measured, and the average of the measured values is used.

In the graphite material 2 in the present invention, the specific surface area (as measured by BET method) is preferably no more than 2 $m^2/g$, more preferably 0.8 to 1.8 $m^2/g$. When the graphite material has a specific surface area of more than 2 $m^2/g$, a relatively large amount of PVDF (polyvinylidene-fluoride) based binder or even SBR (styrene-butadiene rubber) based binder needs to be added. This leads to the decreased mass of active material per unit electrode volume, with the result that the battery capacity is decreased. Since the specific surface area is increased, the surface activity of the particles becomes higher, with the result that the coulombic efficiency may be decreased due to decomposition of electrolytic solution or other factors. The graphite material in the present invention has D50% of preferably 10 to 25 μm in particle diameter distribution based on volume as measured by laser diffraction.

In the graphite material 2 according to a preferred embodiment in the present invention, the ratio $I_D/I_G$ (R value) of a peak strength ($I_D$) in the vicinity of 1360 $cm^{-1}$ to a peak strength ($I_G$) in the vicinity of 1580 $cm^{-1}$ as measured by Raman spectroscopy is preferably no less than 0.01 and no more than 0.2. When the R value is more than 0.2, a large number of highly activated edge portions of graphite material are exposed to the surface thereof. Thus, during charging and discharging, a large number of side reactions are more likely to occur. In contrast, when the R value is less than 0.01, barriers that prevent the entering and exiting of lithium are higher, and thus the current load characteristic is more likely to be degraded.

The laser Raman R value is measured using "NRS3100" made by JASCO Corporation under the conditions that the excitation wavelength is 532 nm, the width of the entrance slit is 200 μm, the exposure period is 15 seconds, the totaling is performed twice and the diffraction grating has 600 bars per millimeter.

In the graphite material 2 according to the preferred embodiment in the present invention, the coefficient of thermal expansion (CTE) at temperatures of 30 to 100° C. is preferably no less than $4.0 \times 10^{-6}$/° C. and no more than $5.0 \times 10^{-6}$/° C. The coefficient of thermal expansion is utilized as an indicator that shows the acicularity of coke. Although graphite materials with a coefficient of thermal expansion of lower than $4.0 \times 10^{-6}$/° C. have high crystallinity of graphite and a high discharge capacity, the particles thereof are more likely to form a plate-like shape. In contrast, although graphite materials with a coefficient of thermal expansion of higher than $5.0 \times 10^{-6}$/° C. have a low aspect ratio, the crystals of graphite are not grown, and a discharge capacity is low. The CTE of the graphite material 2 is measured in the same manner as that of a carbon raw material, which will be described later.

The graphite material 2 in the present invention has the average interplanar spacing $d_{002}$ of (002) plane as measured by X-ray diffraction of preferably 0.3362 nm to 0.3370 nm. The interplanar spacing $d_{002}$ can be measured in a known manner by powder X-ray diffraction (XRD) (see the 117th committee material 117-71-A-1 (1963) of Japan Society for the Promotion of Science by Inakichi Noda and Michio Inagaki, the 117th committee material 117-121-C-5 (1972) of Japan Society for the Promotion of Science by Michio Inagaki et al. and "carbon" No. 36, pp. 25-34, 1963 by Michio Inagaki).

Preferably, in the graphite material 2 in the present invention, the loose bulk density is no less than 0.7 $g/cm^3$, and the powder density is no less than 1.0 $g/cm^3$ and no more than 1.35 $g/cm^3$ after tapping is performed 400 times.

When the graphite material 2 having the characteristics described above is used as carbon material for battery electrodes, high-energy density battery electrodes can be obtained while a high capacity, high coulombic efficiency and an excellent cycle characteristic are maintained.

(Graphite Material 3)

In a graphite material 3 according to a third embodiment in the present invention, D50% is 2 to 9 μm in particle diameter distribution based on volume as measured by laser diffraction, the specific surface area is 2 to 6 $m^2/g$ and no coating layer is substantially included in the surface of the particles. Or the graphite material 3 in the present invention comprises substantially single-composition particles having an isotropic crystal structure, wherein D50% is 2 to 9 μm in particle diameter distribution based on volume as measured by laser diffraction, the specific surface area is 2 to 6 $m^2/g$.

FIG. 1 shows a cross-sectional image of mesocarbon as observed by transmission electron microscopy (TEM). As will be understood from FIG. 1, in the mesocarbon, its surface layer A (coating layer) has a white color (in a state where electron beams are more likely to be transmitted), and its inner layer B has a gray color (in a state where electron beams are less likely to be transmitted). A boundary C appears clearly between the surface layer and the inner layer.

The cross-sectional image of the graphite material in the present invention as observed by TEM has no boundary between the surface layer and the inner layer like that shown in FIG. 2, and has a gray color evenly from the surface layer to the inner layer. That is, in the graphite material in the present invention, no coating layer is substantially included in the surface of the particles, or an isotropic crystal structure is formed and a single composition is substantially formed.

In the graphite material 3 in the present invention, D50% is 2 to 9 μm in particle diameter distribution based on volume as measured by laser diffraction.

The graphite material 3 in the present invention has the specific surface area (as measured by BET method) of 2 to 6 $m^2/g$. When the graphite material has a specific surface area of more than 6 $m^2/g$, a relatively large amount of PVDF-based binder or even SBR-based binder needs to be added. This leads to the decreased mass of active material per unit electrode volume, with the result that the battery capacity is decreased. Since the specific surface area is increased, the surface activity of the particles becomes higher, with the result that the coulombic efficiency may be decreased due to decomposition of electrolytic solution or other factors.

In the graphite material 3 according to a preferred embodiment in the present invention, the ratio $I_D/I_G$ (R value) of a peak strength ($I_D$) in the vicinity of 1360 $cm^{-1}$ to a peak strength ($I_G$) in the vicinity of 1580 $cm^{-1}$ as measured by Raman spectroscopy is preferably no less than 0.01 and no more than 0.2. When the R value is more than 0.2, a large number of highly activated edge portions of graphite material are exposed to the surface thereof. Thus, during charging and discharging, a large number of side reactions are more likely to occur. In contrast, when the R value is less than 0.01, barriers that prevent the entering and exiting of lithium are higher, and thus the current load characteristic is more likely to be degraded.

The laser Raman R value is measured using "NRS3100" made by JASCO Corporation under the conditions that the excitation wavelength is 532 nm, the width of the entrance slit is 200 μm, the exposure period is 15 seconds, the totaling is performed twice and the diffraction grating has 600 bars per millimeter.

The graphite material 3 in the present invention has the average interplanar spacing $d_{002}$ of (002) plane as measured by X-ray diffraction of preferably 0.3362 nm to 0.3370 nm. The interplanar spacing $d_{002}$ can be measured in a known manner by powder X-ray diffraction (XRD) (see the 117th committee material 117-71-A-1 (1963) of Japan Society for the Promotion of Science by Inakichi Noda and Michio Inagaki, the 117th committee material 117-121-C-5 (1972) of Japan Society for the Promotion of Science by Michio Inagaki et al. and "carbon" No. 36, pp. 25-34, 1963 by Michio Inagaki).

In the graphite material 3 in the present invention, the aspect ratio (the maximum length $D_{max}$/the vertical length relative to the maximum length $DN_{max}$ ($D_{max}$=the maximum length between any two points on the perimeter of the image of a particle; $DN_{max}$=the shortest length of a line that, when the image is interposed between two lines parallel to the line of the maximum length, vertically connects the two lines) is preferably 1.0 to 1.32. The aspect ratio can be measured by image analysis using "FPIA3000" made by Sysmex Corporation. At least 3000 points, preferably 30000 points or more, and more preferably 50000 points or more are measured, and the average of the measured values is used.

Preferably, the graphite material 3 in the present invention has the loose bulk density of no less than 0.4 g/cm³, and the powder density of no less than 0.5 g/cm³ and no more than 1 g/cm³ after tapping is performed 400 times.

In the graphite material 3 according to the preferred embodiment in the present invention, the coefficient of thermal expansion (CTE) at temperatures of 30 to 100° C. is no less than $4.0 \times 10^{-6}$/° C. and no more than $5.0 \times 10^{-6}$/° C. The coefficient of thermal expansion is utilized as an indicator that shows the acicularity of coke. Although graphite materials with a coefficient of thermal expansion of lower than $4.0 \times 10^{-6}$/° C. have high crystallinity of graphite and a high discharge capacity, the particles thereof are more likely to form a plate-like shape. In contrast, although graphite materials with a coefficient of thermal expansion of higher than $5.0 \times 10^{-6}$/° C. have a low aspect ratio, the crystals of graphite are not grown, and a discharge capacity is low. The CTE of the graphite material 3 is measured in the same manner as that of a carbon raw material, which will be described later.

When the graphite material having the characteristics described above is used as carbon material for battery electrodes, high-energy density battery electrodes can be obtained while a high capacity, high coulombic efficiency and an excellent cycle characteristic are maintained.

(Producing Method of Graphite Material)

The producing method of a graphite material in the present invention is not particularly limited; the preferred producing method of a graphite material in the present invention includes steps where a carbon raw material in which the loss on heat when the carbon raw material is heated from 300 to 1200° C. under an inert atmosphere is no less than 5% by mass and no more than 20% by mass is pulverized and then subjected to heat treatment at temperatures no less than 2000° C.

The carbon raw material used for the producing method in the present invention is such that the loss on heat when the carbon raw material is heated from 300 to 1200° C. under an inert atmosphere is no less than 5% by mass and no more than 20% by mass. When the loss on heat is less than 5% by mass, particles are more likely to form a plate-like shape. Moreover, since the pulverized surface (edge portion) is exposed, the specific surface area is increased. Thus, the number of side reactions is increased. In contrast, when the loss on heat is more than 20% by mass, the attachment of graphitized particles is increased, and this affects efficiency. When the loss on heat falls within the range described above, the specific surface area of graphite material is reduced, and the number of side reactions is decreased. The reason why the number of side reactions is decreased is not completely clear, but it is thought that the components volatilized by being heated at temperatures of 300 to 1200° C. are carbonized and graphitized, and thus the crystal of the exposed edge portion is recrystallized and stabilized, and furthermore the surface of the particles is smoothed, and thus the specific surface area is reduced.

The loss on heat described above can be measured at an elevating rate of 10° C./minute using a commercially available device that can perform TG and DTA. In the examples of the present invention and the like, measurements were performed using "TGDTAw6300" made by Seiko Instruments Inc. according to the following procedure: about 15 mg of the sample to be measured is accurately weighed, it is placed on a platinum pan and is then set into the device, argon gas is passed at a rate of 200 cm³/minute, the temperature is increased to 1400° C. at a rate of 10° C./minute and then the measurements are performed. As the reference, α-alumina made by Wako Pure Chemical Industries, Ltd. was used after being treated at a temperature of 1500° C. for three hours for the removal of volatile components.

The carbon raw material having the loss on heat as described above is selected from petroleum-derived pitch cokes or coal-derived pitch cokes. In particular, the carbon raw material used for the present invention is preferably selected from green coke that is one of petroleum cokes. The crystal of green coke is not grown and thus is pulverized into a spherical shape, with the result that the specific surface area is more likely to be reduced. Thus, the carbon raw material used for the present invention is preferably a non-needle coke, and more preferably a non-needle coke that is not subjected to heat treatment.

Petroleum cokes are black, porous, solid residues obtained by the cracking or cracking distillation of petroleum oil and bituminous oil. Petroleum cokes are divided into fluid cokes and delayed cokes according to the coking method. Fluid cokes, however, are powders with limited applications and are only used for refinery's home fuel, and thus delayed cokes are commonly referred to as petroleum cokes. Delayed cokes are divided into green cokes (raw cokes) and calcined cokes. Green cokes are cokes without being further processed after being obtained from a coking device; calcined cokes are obtained by heating green cokes again for the removal of volatile components. Since green cokes are likely to cause dust explosion, in order for fine-particle petroleum cokes to be obtained, green cokes are pulverized after being calcined for the removal of volatile components. Conventionally, calcined cokes are generally used for electrodes and the like. Since green cokes have less ash content than coal cokes, they are only used for carbon materials in the carbide industry, cokes for casting and cokes for alloy iron. Green cokes as described above are used in the present invention.

In the carbon raw material used in the present invention, the coefficient of thermal expansion (CTE) at temperatures of 30 to 100° C. is preferably no less than $4.8 \times 10^{-6}$/° C. and no more than $6.0 \times 10^{-6}$/° C. The CTE of the carbon raw material can be measured as follows. By a vibration mill, 500 g of the carbon raw material is pulverized so as to have a size of 28 mesh or less. This sample is screened to obtain 60 g of the carbon raw material having a size of 28 to 60 mesh, 32 g of the carbon raw material having a size of 60 to 200 mesh and 8 g of the carbon raw material having a size of 200 mesh or less. They are mixed to have the total weight of 100 g. This mixed sample is placed into a stainless container, and 25 g of binder pitch is added to it. The sample is heated and mixed evenly in an oil bath maintained at a temperature of 125° C. for 20 minutes. This mixture is cooled and pulverized by the vibration mill so that all the mixture has a size of 28 mesh or less. Into a pressure molding machine maintained at a temperature of 125° C., 30 g of the sample is put, and is pressed and molded at a gauge pressure of 450 kg/cm$^2$ for five minutes. The molded sample is placed into a porcelain crucible. The temperature of the sample is increased in a calcining furnace from a room temperature to 1000° C. for five hours, the sample is maintained at a temperature of 1000° C. for one hour and is then cooled. This calcined sample is cut with a precision cutting machine to have a dimension of 4.3×4.3× 20.0 mm to obtain the test piece. The thermal expansion measurement of this test piece at temperatures of 30 to 100° C. is performed using TMA (thermo mechanical analyzer) such as "TMA/SS 350" made by Seiko Instruments Inc., and consequently the CTE is determined.

Next, this carbon raw material is pulverized. The carbon raw material is pulverized with a known device such as a jet mill, a hammer mill, a roller mill, a pin mill or a vibration mill. Preferably, the carbon raw material is so pulverized as to have as low a heat history as possible. If heat is applied by pulverizing, the amount of components volatilized at temperatures of 300 to 1200° C. as described previously is decreased, and thus it is likely that the effects described previously cannot be obtained.

Preferably, the pulverized carbon raw material is classified to have an average particle size of 10 to 25 μm. When the average particle size is large, the electrode density tends to be difficult to increase. In contrast, when the average particle size is small, side reactions are more likely to occur during charging and discharging. The particle size is measured by "CILUS" using laser diffractometry.

The pulverized carbon raw material may be calcined at a low temperature of about 500 to 1200° C. before a graphitization process, which will be described later. This low-temperature calcining process can reduce the amount of gas generated in the succeeding graphitization process. The low-temperature calcining process needs to be performed under a non-oxidizing atmosphere.

The pulverized carbon raw material is then graphitized. The graphitization process is preferably performed under an atmosphere in which the carbon raw material is difficult to oxidize. Examples of the graphitization process include a heat treatment under an atmosphere of argon gas or the like; and a heat treatment in an Acheson furnace (non-oxidation graphitization process). The non-oxidation graphitization process is preferable in terms of cost.

The lower limit of the temperature of the graphitization process is generally 2000° C., preferably 2500° C., more preferably 2900° C., and most preferably 3000° C. The upper limit of the temperature of the graphitization process is not particularly limited, but is preferably 3300° C. in terms of easily obtaining a high discharge capacity.

Preferably, in the process of the present invention, the graphite material is not broken into pieces nor pulverized after the graphitization process. When the graphite material is broken into pieces or pulverized after the graphitization process, the smoothed surface may be damaged, and this may result in degraded performance.

With this method, it is possible to obtain the graphite material having the structure as shown in FIG. 2.

(Carbon Material for Battery Electrodes)

The carbon material for battery electrodes according to the present invention comprises the graphite material of the present invention. The carbon material for battery electrodes is used as, for example, an anode active substance or an anode conductivity-enhancing agent of a lithium secondary battery.

The carbon material for battery electrodes according to the present invention further comprises a carbon fiber. With respect to 100 parts by mass of the graphite material, 0.01 to 20 parts by mass of the carbon fiber are preferably comprised.

Carbon fibers include organic carbon fibers such as PAN-based carbon fibers, pitch-based carbon fibers and rayon-based carbon fibers and vapor grown carbon fibers. The vapor grown carbon fibers are preferable since they have high crystallinity and high thermal conductivity. For example, the vapor grown carbon fibers are produced according to the following procedure: an organic compound is used as a raw material, the raw material and an organic transition metal compound serving as a catalyst are introduced with a carrier gas into a high-temperature reaction furnace and then they are subjected to heat treatment (for example, see JP-A-S60-054998 and Japanese Patent No. 2778434). The diameter of the carbon fiber is preferably 2 to 1000 nm, and more preferably 0.01 to 0.5 μm; the aspect ratio thereof is preferably 10 to 15000.

The organic compounds serving as a raw material for the carbon fiber include toluene, benzene, naphthalene, gases such as ethylene, acetylene, ethane, natural gas and carbon monoxide and their mixtures. An aromatic hydrocarbon such as toluene or benzene is preferably used.

The organic transition metal compound includes a transition metal serving as a catalyst. Examples of the transition metal include metals in IVa, Va, VIa, VIIa and VIII groups in the periodic table. A compound such as ferrocene or nickelocene is preferably used as the organic transition metal compound.

The carbon fiber used in the present invention may be obtained by breaking into pieces or pulverizing long fibers produced by a vapor growth method or the like. The carbon fiber may be formed of flocs.

Preferably, the carbon fiber used in the present invention has no decomposed substance derived from an organic compound or the like attached to the surface thereof, or has high crystallinity of carbon structure.

For example, the carbon fiber having no decomposed substance attached to the surface thereof, or having high crystallinity of carbon structure can be obtained by calcining (thermally treating) a carbon fiber or preferably a vapor grown carbon fiber under an inert gas atmosphere. Specifically, the carbon fiber having no decomposed substance attached to the surface thereof can be obtained by heat treatment under an inert gas atmosphere such as argon at temperatures of about 800 to 1500° C. The carbon fiber having high crystallinity of carbon structure can be obtained by heat treatment under an inert gas atmosphere such as argon at temperatures of preferably 2000° C. or higher, and more preferably 2000 to 3000° C.

Preferably, the carbon fiber used in the present invention includes branched fibers. The carbon fiber may partially have a continuous hollow structure in the fibers. To have such a structure, carbon layers constituting cylindrical portions of the fibers are continuous. The hollow structure may partially have carbon layers wound like cylinders, and such carbon layers includes carbon layers wound like substantial cylinders, partially non-continuous carbon layers and two stacked carbon layers combined into one layer. The shape of the cross sections of the cylinders is not limited to a complete circle, but may be oval or polygonal.

In the favorable carbon fiber used in the present invention, the average interplanar spacing $d_{002}$ of (002) plane as measured by X-ray diffraction is preferably no more than 0.344 nm, more preferably no more than 0.339 nm, and most preferably no more than 0.338 nm. The thickness (Lc) of a crystal in the direction of the C-axis is preferably no more than 40 nm.

(Paste for Electrodes)

The paste for electrodes according to the present invention comprises the above-described carbon material for battery electrodes and a binder. The paste for electrodes is obtained by kneading the carbon material for battery electrodes and the binder. A known device such as a ribbon mixer, a screw kneader, a spartan lyser, a Lödige mixer, a planetary mixer or a universal mixer can be used for kneading process. The paste for electrodes can be molded into a sheet, a pellet or other shapes.

Examples of the binder used in the paste for electrodes include the following known binders: fluorinated binders such as polyvinylidene-fluoride and polytetrafluoroethylene, and rubber-based binders such as SBR (styrene-butadiene rubber).

With respect to 100 parts by mass of the carbon material for battery electrodes, the amount of binder used is normally 1 to 30 parts by mass, and more preferably 3 to 20 parts by mass.

A solvent may be used for kneading process. Examples of the solvent include the following known solvents suitable for binders: toluene, N-methylpyrrolidone and the like for fluorinated binders; water and the like for rubber-based binders; and other solvents such as dimethylformamide and isopropanol. A thickener is preferably used with a binder using water as a solvent. The amount of solvent used is adjusted so that the viscosity of the binder is suitable in applying it to a collector.

(Electrode)

The electrode according to the present invention is formed of a molded piece of the above-described paste for electrodes. For example, the electrode according to the present invention is obtained by applying the paste for electrodes to a collector, drying it and pressure-molding it.

Examples of the collector include foils and meshes of aluminum, nickel, copper, stainless steel and the like. The thickness of the paste applied is generally 50 to 200 μm. When the thickness of the paste applied is too large, it is likely that the anode cannot be housed in a standardized battery case. The method of application of the paste is not particularly limited. Examples of the applying method include the following method: the past is applied with a doctor blade, a barcoater or the like, and it is then molded with a roll press or the like.

Methods of pressure-molding include roll-pressing and press-molding. The pressure applied when the electrode is pressure-molded is preferably about 1 to 3 t/cm². As the electrode density of the electrode is increased, the battery capacity per volume generally becomes higher. However, when the electrode density is excessively increased, the cycle characteristic is generally degraded. With the paste for electrodes according to the present invention, even when the electrode density is increased, the cycle characteristic is less degraded. Thus, it is possible to obtain electrodes having a high electrode density. The maximum electrode density when the paste for electrodes according to the present invention is used is generally 1.7 to 1.9 g/cm³. The electrode thus obtained is suitable for the anode of a battery, and especially for the anode of a secondary battery.

(Battery and Secondary Battery)

The battery or the secondary battery according to the present invention comprises the above-described electrode as a component (preferably as an anode).

A description will now be given of the battery and the secondary battery according to the present invention by way of examples of a lithium secondary battery. The lithium secondary battery has a structure in which a cathode and an anode are immersed in electrolytic solution or electrolyte. The electrode according to the present invention is used as the anode.

As a cathode active substance used in the cathode of the lithium secondary battery, a lithium-containing transition metal oxide is generally used. Preferably, the lithium-containing transition metal oxide is an oxide that mainly contains at least one transition metal element selected from the group consisting of Ti, V, Cr, Mn, Fe, Co, Ni, Mo and W, and lithium, the oxide being characterized in that the molar ratio of lithium to the transition metal element is 0.3 to 2.2. More preferably, the lithium-containing transition metal oxide is an oxide that mainly contains at least one transition metal element selected from the group consisting of V, Cr, Mn, Fe, Co and Ni, and lithium, the oxide being characterized in that the molar ratio of lithium to the transition metal element is 0.3 to 2.2. With respect to the mainly contained transition metal, less than 30% by mol of Al, Ga, In, Ge, Sn, Pb, Sb, Bi, Si, P, B or the like may be contained. At least one substance having a spinel structure represented by the general chemical formula "$Li_xMO_2$" (where M is at least one of Co, Ni, Fe and Mn, x=0 to 1.2) or the general chemical formula "$Li_yA_2O_4$" (where A contains at least Mn, y=0 to 2) is preferably used as the cathode active substance.

More preferably, a material containing a substance represented by the general chemical formula "$Li_yM_aD_{1-a}O_2$" (where M is at least one of Co, Ni, Fe and Mn, D is at least one of Co, Ni, Fe, Mn, Al, Zn, Cu, Mo, Ag, W, Ga, In, Sn, Pb, Sb, Sr, B and P other than M, y=0 to 1.2 and a=0.5 to 1) or at least one substance having a spinel structure represented by the general chemical formula "$Li_z(A_bE_{1-b})_2O_4$" (where A is Mn, E is at least one of Co, Ni, Fe, Mn, Al, Zn, Cu, Mo, Ag, W, Ga, In, Sn, Pb, Sb, Sr, B and P, b=1 to 1.2 and z=0 to 2) is used as the cathode active substance.

Specific examples of the cathode active substance include: $Li_xCoO_2$, $Li_xNiO_2$, $Li_xMnO_2$, $Li_xCo_aNi_{1-a}O_2$, $Li_xCO_bV_{1-b}O_z$, $Li_xCO_bFe_{1-b}O_2$, $Li_xMn_2O_4$, $Li_xMn_bCO_{2-c}O_4$, $Li_xMn_cNi_{2-c}O_4$, $Li_xMn_cV_{2-c}O_4$ and $Li_xMn_cFe_{2-c}O_4$ (where x=0.02 to 1.2, a=0.1 to 0.9, b=0.8 to 0.98, c=1.6 to 1.96 and z=2.01 to 2.3). Most preferably, examples of the lithium-containing transition metal oxide include: $Li_xCoO_2$, $Li_xNiO_2$, $Li_xMnO_2$, $Li_xCo_aNi_{1-a}O_2$, $Li_xMn_2O_4$ and $Li_xCO_bV_{1-b}O_z$ (where x=0.02 to 1.2, a=0.1 to 0.9, b=0.9 to 0.98, z=2.01 to 2.3). The "x" represents a value before the start of charging and discharging. The value "x" increases or decreases depending on charging and discharging.

The average particle size of the cathode active substance is not particularly limited, but is preferably 0.1 to 50 μm. Preferably, the volume of particles having a diameter of 0.5 to 30 μm accounts for 95% or more. More preferably, the volume of particles having a diameter of 3 μm or less accounts for 18% or less of the entire volume, and the volume of particles having a diameter no less than 15 μm and no more than 25 μm accounts for 18% or less of the entire volume. The specific surface area is not particularly limited. The specific surface area measured by BET, however, is preferably 0.01 to 50 m²/g, and more preferably 0.2 to 1 m²/g. The pH of the supernatant portion of the solution in which 5 g of the cathode active substance is dissolved in 100 ml of distilled water is preferably no less than 7 and no more than 12.

In the lithium secondary battery, a separator may be provided between the anode and cathode. Examples of the separator include a nonwoven fabric, a cloth, a microporous film and their combinations that have, as a main ingredient, polyolefin such as polyethylene or polypropylene.

As the electrolytic solution and electrolyte comprised in the lithium secondary battery according to the present invention, known organic electrolytic solution, inorganic solid electrolyte or polymeric solid electrolyte may be used. The organic electrolytic solution is preferably used in terms of electrical conductivity.

The organic solution including one of the following substances is preferably used as the organic electrolytic solution: ethers such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobuthyl ether, diethylene glycol dimethyl ether or ethylene glycol phenyle ether; amides such as formamide, N-methyl formamide, N,N-dimethyl formamide, N-ethyl formamide, N,N-diethyl formamide, N-methyl acetamide, N,N-dimethyl acetamide, N-ethyl acetamide, N,N-diethyl acetamide, N,N-dimethyl propion amide or hexamethyl phosphoryl amide; sulfuric compounds such as dimethyl sulfoxide or sulfolane; dialkyl ketones such as methyl ethyl ketone or methyl isobutyl ketone; cyclic ethers such as ethylene oxide, propylene oxide, tetrahydrofuran, 2-methoxy tetrahydrofuran, 1,2-dimethoxyethane or 1,3-dioxolan; carbonates such as ethylene carbonate or propylene carbonate; γ-butyrolactone; N-methylpyrrolidone; acetonitrile; or nitromethane. More preferably, the solution including one of the following substances is used as the organic electrolytic solution: esters such as ethylene carbonate, butylene carbonate, diethyl carbonate, dimethyl carbonate, propylene carbonate, vinylene carbonate or γ-butyrolactone; ethers such as dioxolan, diethyl ether or diethoxyethane; dimethyl sulfoxide; acetonitrile; tetrahydrofuran; or the like. Most preferably, the solution including one of the following substances is used as the organic electrolytic solution: carbaonate-based nonaqueous solvent such as ethylene carbonate or propylene carbonate. Of these solvents, only one solvent or a combination of two or more solvents may be used.

Lithium salt is used as a solute (electrolyte) for these solvents. Common lithium salts include $LiClO_4$, $LiBF_4$, $LiPF_6$, $LiAlCl_4$, $LiSbF_6$, $LiSCN$, $LiCl$, $LiCF_3SO_3$, $LiCF_3CO_2$ and $LiN(CF_3SO_2)_2$.

Examples of the polymeric solid electrolyte include a polyethylene oxide derivative, a polymer containing the polyethylene oxide derivative, a polypropylene oxide derivative, a polymer containing the polypropylene oxide derivative, a phosphoric acid ester polymer, a polycarbonate derivative, and a polymer containing the polycarbonate derivative.

The selection of members necessary for the battery other than those described above is not limited at all.

Since the battery or the secondary battery according to the present invention has an excellent charge-discharge cycle characteristic and an excellent large-current load characteristic, it can be applied to the fields of, for example, electric tools such as an electric drill and hybrid cars and the like, where conventionally, lead-acid secondary batteries, nickel-cadmium secondary batteries and nickel-metal-hydride secondary batteries are mainly used.

EXAMPLES

Hereinafter, a more specific description will be given by way of a typical example of the present invention. It should be noted that the following description is illustrative only and the present invention is not limited to the following description.

The properties or the like described in examples below were measured according to the following methods.
(Specific Surface Area)

The specific surface areas were measured using a specific-surface-area measuring device "NOVA-1200" (made by Yuasa Ionics Inc.) by the commonly used BET method.
(Battery Evaluation Method)
(1) Preparation of the Paste 0.1 part by mass of "KF polymer L1320" (an N-methylpyrrolidone (NMP) solution containing 12% by mass of polyvinylidene-fluoride (PVDF)) made by Kureha Corporation were added to 1 part by mass of graphite material, and an undiluted solution of a base compound was obtained by kneading them with a planetary mixer.
(2) Fabrication of the Electrode NMP was added to the undiluted solution of the base compound, their viscosity was thereby adjusted, and they were then applied to high-purity cooper foil using a doctor blade so as to have a thickness of 250 μm. This was vacuum-dried at a temperature of 120° C. for one hour, and then was press-cut so as to have a diameter of 18 mm. The press-cut electrode was sandwiched and pressed by a super-steel press plate at a pressure of about $1\times10^2$ to $3\times10^2$ $N/mm^2$ ($1\times10^3$ to $3\times10^3$ $kg/cm^2$). Thereafter, it was vacuum-dried at a temperature of 120° C. for 12 hours and was used as an electrode for evaluation.
(3) Fabrication of the Battery A three-pole cell was made as follow. The following process was performed under the atmosphere of dry argon having a dew point of −80° C. or less.

In a cell (having an inside diameter of about 18 mm) of polypropylene with a screw lid, the carbon electrode attached to the cooper foil made according to process (2) described above and metal lithium foil were sandwiched and laminated with a separator (a microporous film of polypropylene ("cellguard 2400")). Similarly, metal lithium for reference was laminated. An electrolytic solution was added to this, so that a testing cell was obtained.
(4) Electrolytic Solution $LiPF_6$ (1 mol/liter) was dissolved as an electrolyte in a liquid mixture composed of 8 parts by mass of EC (ethylene carbonate) and 12 parts by mass of DEC (diethyl carbonate).
(5) Charge-Discharge Cycle Test A constant current and constant voltage charge-discharge test was performed at a current density of 0.2 $mA/cm^2$ (corresponding to 0.1 C).

Constant-current charging (intercalation of lithium into carbon) was performed at a current density of 0.2 $mA/cm^2$ such that the voltage is changed from a rest potential to 0.002 V. Then, when the voltage reached 0.002 V, the constant-current charging was switched to constant-voltage charging, and when the current was decreased to 25.4 μA, the constant-voltage charging was stopped.

Constant-current discharging (emission of lithium from carbon) was performed at a current density of 0.2 $mA/cm^2$ (corresponding to 0.1 C) and was cut off at a voltage of 1.5V.
(Graphite Material 1)

Example 1

Petroleum derived green coke (non-needle coke) in which the loss on heat, as measured by TG, when it is heated from 300 to 1200° C. was 11.8% by mass was pulverized using a bantam mill made by Hosokawa Micron Corporation. The pulverized petroleum derived green coke was classified by air current using "Turbo Classifier" made by Nisshin Engineering Inc., and thus a carbon raw material was obtained that had a D50 of 14.2 μm. The pulverized carbon raw material was loaded into a graphite crucible with a screw lid, and was graphitized in an Acheson furnace at a temperature of 3000° C. Consequently, the graphite material was obtained that was characterized in that the laser Raman R value was 0.03 and the CTE was $4.2 \times 10^{-6}$ °C.$^{-1}$. Since the graphite material thus obtained had a small specific surface area, a battery was obtained that had an excellent discharge capacity, excellent beginning efficiency and an excellent cycle characteristic. The result is shown in Table 1.

TABLE 1

|  | Ex. 1 | Ex. 2 | Comp. Ex. 1 | Comp. Ex. 2 |
|---|---|---|---|---|
| Production process | Green coke (non-needle) → pulverizing → graphitization | Green coke (non-needle) → pulverizing → calcining → graphitization | Green coke (non-needle) → calcining 1200° C. → pulverizing → graphitization | Green coke (non-needle) → graphitization → pulverizing |
| Carbon raw material | Petroleum coke | Petroleum coke | Petroleum coke | Petroleum coke |
| loss on heat at 300° C.–1200° C.[%] | 11.8 | 12.1 | 1.2 | 1.3 |
| History maximum-temperature before pulverizing [° C.] | 400 | 400 | 1200 | 3000 |
| Graphitization process temperature [° C.] | 3000 | 3000 | 3000 | 3000 |
| Graphite material properties | | | | |
| Laser Raman R value | 0.03 | 0.03 | 0.06 | 0.50 |
| CTE [° C.$^{-1}$] | $4.2 \times 10^{-6}$ | $4.3 \times 10^{-6}$ | $4.1 \times 10^{-6}$ | $3.8 \times 10^{-6}$ |
| $d_{002}$ [nm] | 0.3365 | 0.3364 | 0.3366 | 0.3366 |
| Average particle diameter D50 [μm] | 14.2 | 14.8 | 14.9 | 15.2 |
| Specific surface area [m$^2$/g] | 1.41 | 1.39 | 2.10 | 5.50 |
| Tap density (400 times) [g/cm$^3$] | 1.28 | 1.29 | 1.15 | 0.97 |
| Battery characteristics | | | | |
| Discharge capacity [mAh/g] | 332 | 330 | 332 | 335 |
| Beginning efficiency [%] | 94.2 | 94.3 | 93.8 | 90.0 |

Example 2

The same test as in Example 1 was performed except that after the pulverizing had been completed, a heat treatment at a temperature of 1200° C. (low-temperature calcining) was performed before graphitization. The result is shown in Table 1.

Comparative Example 1

The same test as in Example 1 was performed except that before being pulverized, the green coke was subjected to a heat treatment at a temperature of 1200° C. (calcining). The result is shown in Table 1. The specific surface area was large, and the tap density was slightly low.

Comparative Example 2

The green coke was graphitized at a temperature of 3000° C. without being pulverized and was then pulverized and classified by air current as in Example 1. The same analyses and battery evaluation as in Example 1 were performed. The result is shown in Table 1. The specific surface area was extremely large, and the beginning efficiency was decreased.

Table 1 shows that the graphite materials (in comparative examples) that were heated by the calcining and graphitizing processes to have a loss on heat of less than 5% by mass and that were then pulverized provide a low discharge capacity and poor beginning efficiency. Table 1 also shows the following. The carbon raw materials in which the loss on heat when the carbon materials were heated from 300 to 1200° C. under an inert atmosphere was no less than 5% by mass and no more than 20% by mass were pulverized, and the pulverized carbon raw materials were then graphitized, with the result that carbon materials (in examples) were obtained in which the ratio $I_D/I_G$ (R value) of a peak strength ($I_D$) in the vicinity of 1360 cm$^{-1}$ to a peak strength ($I_G$) in the vicinity of 1580 cm$^{-1}$ as measured by Raman spectroscopy was no less than 0.01 and no more than 0.2, and the coefficient of thermal expansion (CTE) at temperatures of 30 to 100° C. was no less than $4.0 \times 10^{-6}$/° C. and no more than $5.0 \times 10^{-6}$/° C. Table 1 further shows that the use of the graphite materials of the examples as electrode active materials results in a high discharge capacity and an excellent beginning efficiency.

(Graphite Material 2)

Example 3

Petroleum derived green coke in which the loss on heat, as measured by TG, when it was heated from 300 to 1200° C. was 11.8% by mass was pulverized using a bantam mill made by Hosokawa Micron Corporation. The pulverized petroleum derived green coke was classified by air current using "Turbo Classifier" made by Nisshin Engineering Inc., and thus a carbon raw material was obtained that had a D50 of 14.2 μm. The pulverized carbon raw material was loaded into a graphite crucible with a screw lid, and was graphitized in an Acheson furnace at a temperature of 3000° C. Consequently, the graphite material was obtained that was characterized in that the laser Raman R value was 0.03 and the CTE was $4.2 \times 10^{-6}$ °C.$^{-1}$. Since the graphite material thus obtained had a small specific surface area, a battery was obtained that had an excellent discharge capacity, excellent beginning efficiency and an excellent cycle characteristic. The result is shown in Table 2.

TABLE 2

| | Ex. 3 | Ex. 4 | Comp. Ex. 3 | Comp. Ex. 4 |
|---|---|---|---|---|
| Production process | Green coke (non-needle) → pulverizing → graphitization | Green coke (non-needle) → pulverizing → calcining → graphitization | Green coke (non-needle) → calcining 1200° C. → pulverizing → graphitization | Green coke (non-needle) → graphitization → pulverizing |
| Carbon raw material | Petroleum coke | Petroleum coke | Petroleum coke | Petroleum coke |
| loss on heat at 300° C.-1200° C.[%] | 11.8 | 12.1 | 1.2 | 1.3 |
| History maximum-temperature before pulverizing [° C.] | 400 | 400 | 1200 | 3000 |
| Graphitization process temperature [° C.] | 3000 | 3000 | 3000 | 3000 |
| Graphite material properties | | | | |
| Aspect ratio | 1.31 | 1.30 | 1.35 | 1.37 |
| Laser Raman R value | 0.03 | 0.03 | 0.06 | 0.50 |
| CTE [° C.$^{-1}$] | $4.2 \times 10^{-6}$ | $4.3 \times 10^{-6}$ | $4.1 \times 10^{-6}$ | $3.8 \times 10^{-6}$ |
| $d_{002}$ [nm] | 0.3365 | 0.3364 | 0.3366 | 0.3366 |
| Average particle diameter D50 [μm] | 14.2 | 14.8 | 14.9 | 15.2 |
| Specific surface area [m$^2$/g] | 1.41 | 1.39 | 2.10 | 5.50 |
| Loose bulk density [g/cm$^3$] | 0.92 | 0.93 | 0.81 | 0.68 |
| Tap density (400 times) [g/cm$^3$] | 1.28 | 1.29 | 1.15 | 0.97 |
| Battery characteristics | | | | |
| Discharge capacity [mAh/g] | 332 | 330 | 332 | 335 |
| Beginning efficiency [%] | 94.2 | 94.3 | 93.8 | 90.0 |

Example 4

The same test as in Example 3 was performed except that after the pulverizing had been completed, a heat treatment at a temperature of 1200° C. (low-temperature calcining) was performed before graphitization. The result is shown in Table 2.

Comparative Example 3

The same test as in Example 3 was performed except that before being pulverized, the green coke was subjected to a heat treatment at a temperature of 1200° C. (calcining). The result is shown in Table 2. The specific surface area was large, and the tap density was slightly low.

Comparative Example 4

The green coke was graphitized at a temperature of 3000° C. without being pulverized, and was then pulverized and classified by air current as in Example 3. The same analyses and battery evaluation as in Example 3 were performed. The result is shown in Table 2. The specific surface area was extremely large, and the beginning efficiency was decreased.

(Graphite Material 3)

Example 5

Petroleum derived green coke in which the loss on heat, as measured by TG, when it was heated from 300 to 1200° C. was 11.8% by mass was pulverized using a bantam mill made by Hosokawa Micron Corporation. The pulverized petroleum derived green coke was classified by air current using "Turbo Classifier" made by Nisshin Engineering Inc., and thus a carbon raw material was obtained that had a D50 of 4.8 μm. The pulverized carbon raw material was loaded into a graphite crucible with a screw lid, and was graphitized in an Acheson furnace at a temperature of 3000° C. Consequently, the graphite material was obtained that was characterized in that the laser Raman R value was 0.03 and the CTE was $4.2 \times 10^{-6}$° C.$^{-1}$. Since the graphite material thus obtained had a small specific surface area, a battery was obtained that had an excellent discharge capacity, excellent beginning efficiency and an excellent cycle characteristic. The result is shown in Table 3.

TABLE 3

| | Ex. 5 | Ex. 6 | Comp. Ex. 5 |
|---|---|---|---|
| Production process | Green coke (non-needle) → pulverizing → graphitization | Green coke (non-needle) → pulverizing → calcining → graphitization | Green coke (non-needle) → calcining 1200° C. → pulverizing → graphitization |
| Carbon raw material | Petroleum coke | Petroleum coke | Petroleum coke |
| loss on heat at 300° C.-1200° C.[%] | 11.8 | 12.1 | 1.2 |
| History maximum- | 400 | 400 | 1200 |

TABLE 3-continued

|  | Ex. 5 | Ex. 6 | Comp. Ex. 5 |
| --- | --- | --- | --- |
| temperature before pulverizing [° C.] |  |  |  |
| Graphitization process temperature [° C.] | 3000 | 3000 | 3000 |
| Graphite material properties | | | |
| Aspect ratio | 1.31 | 1.30 | 1.35 |
| Laser Raman R value | 0.05 | 0.04 | 0.06 |
| CTE [° C.$^{-1}$] | $4.2 \times 10^{-6}$ | $4.3 \times 10^{-6}$ | $4.1 \times 10^{-6}$ |
| $d_{002}$ [nm] | 0.3365 | 0.3364 | 0.3366 |
| Particle diameter distribution [μm] D10 | 1.5 | 1.3 | 1.2 |
| D50 | 4.5 | 4.4 | 4.2 |
| D90 | 8.3 | 8.5 | 8.2 |
| Specific surface area [m$^2$/g] | 3.30 | 3.40 | 13.20 |
| Loose bulk density [g/cm$^3$] | 0.52 | 0.55 | 0.19 |
| Tap density (400 times) [g/cm$^3$] | 0.63 | 0.67 | 0.22 |
| Battery characteristics | | | |
| Discharge capacity [mAh/g] | 332 | 330 | 332 |
| Beginnig efficiency [%] | 90.2 | 90.3 | 85.5 |

Example 6

The same test as in Example 5 was performed except that after the pulverizing had been completed, a heat treatment at a temperature of 1200° C. (low-temperature calcining) was performed before graphitization. The result is shown in Table 3.

Comparative Example 5

The same test as in Example 5 was performed except that before being pulverized, the green coke was subjected to a heat treatment at a temperature of 1200° C. (calcining). The result is shown in Table 3. The specific surface area was large, and the tap density was slightly low.

The invention claimed is:

1. A graphite material, said graphite material having a D50% of 2 to 9 μm in particle diameter distribution based on volume as measured by laser diffraction, a specific surface area of 2 to 6 m$^2$/g; said material additionally containing no coating layer included in a surface of the particle, or containing no boundary between the surface layer and the inner layer of the material.

2. A graphite material having an isotropic crystal structure, wherein said graphite material has a D50% of 2 to 9 μm in particle diameter distribution based on volume as measured by laser diffraction, and a specific surface area is 2 to 6 m$^2$/g.

3. The graphite material according to claim 1, wherein the graphite material is produced from a raw material that is a non-needle coke.

4. The graphite material according to claim 3, wherein the non-needle coke is a petroleum-derived pitch coke.

5. The graphite material according to claim 1, wherein the graphite material has a laser Raman R value of no less than 0.01 and no more than 0.2, and a CTE at temperatures of 30 to 100° C. of no less than $4.0 \times 10^{-6}$/°C. and no more than $5.0 \times 10^{-6}$/°C.

6. The graphite material according to claim 1, wherein the graphite material has a $d_{002}$ of 0.3362 nm to 0.3370 nm.

7. The graphite material according to claim 1, wherein the graphite material contains primary particles and an aspect ratio of a primary particle is 1.00 to 1.32.

8. The graphite material according to claim 1, wherein the graphite material has a loose bulk density of no less than 0.4 g/cm$^3$, and a powder density of no less than 0.5 g/cm$^3$ and no more than 1 g/cm$^3$ after tapping is performed 400 times.

* * * * *